(No Model.)

J. LOGAN.
PLOW BEAM AND ATTACHMENT.

No. 310,694. Patented Jan. 13, 1885.

Witnesses:
Frank J. Arni
William Knaus

Inventor:
James Logan

UNITED STATES PATENT OFFICE.

JAMES LOGAN, OF OTTERVILLE, MISSOURI.

PLOW-BEAM AND ATTACHMENT.

SPECIFICATION forming part of Letters Patent No. 310,694, dated January 13, 1885.

Application filed June 6, 1884. (No model.)

*To all whom it may concern:*

Be it known that I, JAMES LOGAN, a citizen of the United States, residing at Otterville, in the county of Cooper and State of Missouri, have invented certain new and useful Improvements in Plow-Beams and Attachments; and I do hereby declare the following to be a full, clear, and exact description of the invention, such as will enable others skilled in the art to which it appertains to make and use the same.

This invention relates to an improved form of plow-beam and forward draft attachment for the purpose of securing lighter draft by means of low and close hitching, at the same time maintaining steadiness of the plow and complete government of the draft in plowing. These results are attained by the peculiar construction of the parts and the combination and arrangement of the same illustrated by the accompanying drawings and specifications, in which the same letters of reference denote the same parts in all the views.

Figure 1:
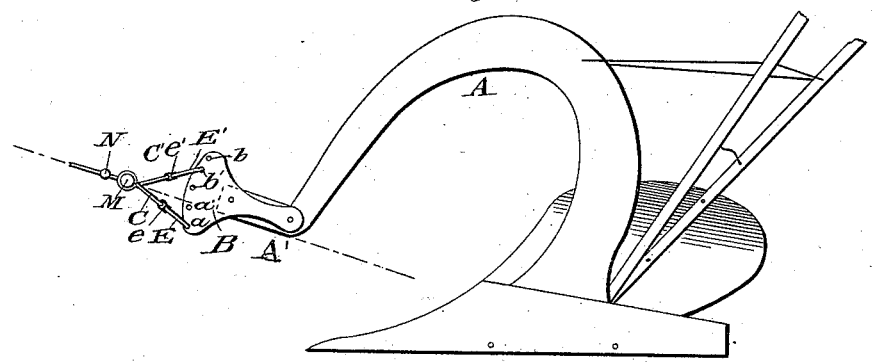
Figure 2:
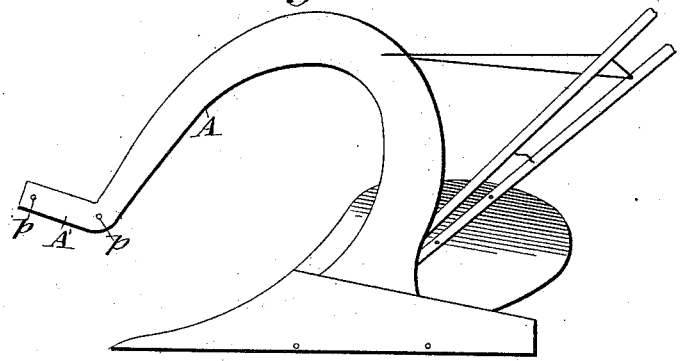
Figure 3:
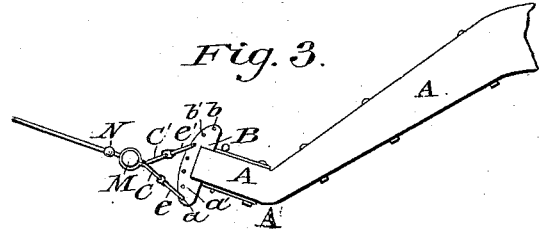
Figure 4:
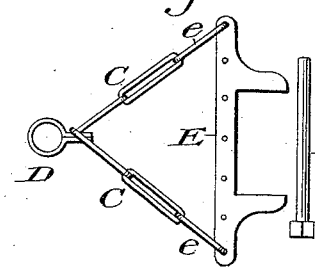

Figure 1 is a side elevation of a plow with iron beam embodying my improvement, and showing the application thereof. (Except the beam, the plow is of ordinary construction.) Fig. 2 represents an iron-beam plow without the draft attachment, showing the form of the beam, the relative position of the lowest point, *i*, the angle of elevation of the forward extension, and the perforations $p\ p'$ for the adjustment of the upright clevis. Fig. 3 represents part of a wooden beam with attachments for draft. This shows a form of upright clevis that is preferable for a wooden beam. Fig. 4 represents one of the horizontal clevis and draft links.

A A is the plow-beam. B is the upright clevis. This may be the double clevis in common use, only more extended, as in Fig. 1, or it may be as shown in Fig. 3.

E E' are two horizontal clevises attached to B by means of bolts at equal distances above and below the line of draft.

*e e'* are small clevises attached to E E', as in Fig. 1, or directly to B, as in Fig. 3.

D is draft band or clevis of double-tree or evener.

C C' are draft-links connecting double-tree clevis with *e e'*.

That others skilled in the art to which my invention appertains may be able fully to understand and use the same, I will further describe its construction and operation.

The beam is attached to the plow in the ordinary way. The only peculiarity is from the top of the standard or highest point of the beam forward. From the highest point the beam is so curved or bent abruptly downward as to bring it to meet the line of draft, about ten inches high, immediately above or slightly forward of the point of the plow. From this lowest point the beam is bent or brought forward six or eight inches, not horizontally, but inclining upward at an angle of about eighteen degrees, or parallel with the line of draft. The end of the beam is not the lowest point; but from the lowest point the beam extends forward, inclining upward at an angle to coincide with the line of draft. This is important. It gives the right inclination for properly adjusting the upright clevis B, and it promotes steadiness, since whatever of length there is of this forward extension lying in the line of draft is so much of leverage to keep the plow steady. It need be only of sufficient length to allow of the proper adjustment of the clevis B. The purpose of curving the beam down so abruptly is to get low close hitching point, so as to increase the angle of elevation of the line of draft, and to get a form of beam that will secure this, and at the same time allow the plow to run level at the proper depth. As the line of draft inclines upward from the center of draft in the plow along the tugs to the horses' shoulders, of course the lower we hitch the closer or farther back we must hitch; but sufficient height must be left that there be no interference with the operation of plowing. This will determine the position of the lowest point. I have considered about ten inches high for the lowest point the best for general purposes, and this height in the line of draft is reached at from immediately above to three or four inches in advance of the plow-point, depending upon the inclination of the share and the extension of the point of plow. This for low close hitching and level running of the plow at the proper depth.

I am aware that plow-beams more or less crooked or curved are in use; but none of these secure or claim to secure the object I attain by my improvement—viz., a beam so curved or bent as to meet the line of draft so low and so close to the plow, thus securing low and close hitching for lightness of draft, at the same time allowing the plow to run level at the proper depth; and no other plow-beam has the forward end to which the clevis B is attached inclined upward at a given angle to coincide with the line of draft for the purpose set forth. The draft attachment is thus constructed, viz: To end of beam A is attached upright clevis B, either double and attached by horizontal bolts, as in Fig. 1, or single and attached as in Fig. 3. This clevis is so adjusted that the line of perforations $a\ a'\ b\ b'$ is at right angles with the line of draft. To this is attached, by means of bolts and the perforations $a\ a'\ a''\ b\ b'$, &c., two horizontal clevises, E E', Fig. 1, one above and the other below the line of draft, at equal distances from that line. To these are attached small clevises $e\ e'$. These connect with the draft-links C C', that together connect with the double-tree clevis or draft-band D. This combination constitutes the draft attachment of beam A to the clevis D or draft-band of double-tree. The clevises E E', Fig. 1, or $e\ e'$, Fig. 3, being attached to B at equal distances above and below the line of draft, the tendency of the plow to tip on the point is corrected, and steadiness at a uniform depth is maintained. Greater steadiness laterally may be secured by arranging the connections between D and E E' in pairs, as illustrated in Fig. 4, which represents a top view of one of these connections paired or doubled. E represents one of the horizontal clevises attached to B by bolt F. To both ends of E are attached small clevises $e\ e'$. These connect with C C, which unite in ring $r$, that connects with draft band or clevis D. The other connection is arranged in like manner.

Having described my invention, what I claim as new, and desire to secure by Letters Patent, is—

1. The plow-beam A, curved sharply upward and then abruptly downward, as shown, to the point A', thence extending forward and upward at an angle of about eighteen degrees to the clevis end, whereby the beam meets the line of draft slightly in advance of the plow-point, and a low close hitch is secured, substantially as shown and described.

2. The combination, in a draft attachment, of the vertical clevis B, the two horizontal clevises, E E', the draft-links C C', and clevis or draft band D, substantially as shown and described.

In testimony whereof I affix my signature in presence of two witnesses.

JAMES LOGAN.

Witnesses:
   FRANK J. ARNI,
   WILLIAM KNAUS.